United States Patent
Nakajima

(10) Patent No.: US 11,812,519 B2
(45) Date of Patent: Nov. 7, 2023

(54) COMMUNICATION APPARATUS, CONTROL METHOD, AND COMPUTER-READABLE STORAGE MEDIUM

(71) Applicant: CANON KABUSHIKI KAISHA, Tokyo (JP)

(72) Inventor: Takafumi Nakajima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/079,275

(22) Filed: Oct. 23, 2020

(65) Prior Publication Data

US 2021/0136868 A1 May 6, 2021

(30) Foreign Application Priority Data

Oct. 30, 2019 (JP) .................. 2019-198009

(51) Int. Cl.
*H04W 88/12* (2009.01)
*H04W 76/15* (2018.01)
*H04W 84/12* (2009.01)
*H04W 88/08* (2009.01)

(52) U.S. Cl.
CPC .......... *H04W 88/12* (2013.01); *H04W 76/15* (2018.02); *H04W 84/12* (2013.01); *H04W 88/08* (2013.01)

(58) Field of Classification Search
CPC ..... H04W 76/15; H04W 84/12; H04W 88/08; H04W 88/12; H04W 84/18; H04W 52/46; H04W 92/20; H04W 24/02; H04L 41/0803; H04L 41/0886; H04L 41/12; H04L 12/44

See application file for complete search history.

(56) References Cited

U.S. PATENT DOCUMENTS

| 9,088,988 B1* | 7/2015 | Park ................. H04L 5/0064 |
| 10,542,486 B1* | 1/2020 | Strater ............. H04W 48/16 |
| 10,785,809 B1* | 9/2020 | Thubert ............ H04W 40/246 |

(Continued)

FOREIGN PATENT DOCUMENTS

| CN | 104144458 A | 11/2014 |
| CN | 106797602 A | 5/2017 |

(Continued)

OTHER PUBLICATIONS

Vladimir Oksman, On the Modem In-Home Distribution Architecture; C0560, ITU-T Draft, Study Period 2017-2020, Study Group 15, Series C0560, International Telecommunication Union, Geneva, Switzerland, XP044237410, vol. 4/15, Jan. 2018, pp. 1-5 (Retrieved from Internet: https://www.itu.int/ifa/t/2017/sg15/docs/c/ties/T17-SG15-C-0560!!MSW-E.docx).

*Primary Examiner* — Quoc Thai N Vu
(74) *Attorney, Agent, or Firm* — Canon U.S.A., Inc. IP Division

(57) ABSTRACT

A communication apparatus operating as a base station having a function of configuring a network is provided. The communication apparatus communicates with a control apparatus for controlling a network comprised of a plurality of base stations; the communication apparatus further establishes, with another base station belonging to the network, a link to be used for communication with the other base station; and the communication apparatus also notifies, in a case where a plurality of the links is established with the another base station, the control apparatus of establishment of the link.

20 Claims, 8 Drawing Sheets

(56) References Cited

U.S. PATENT DOCUMENTS

| | | | |
|---|---|---|---|
| 2009/0257380 A1* | 10/2009 | Meier | H04W 72/082 |
| | | | 370/329 |
| 2010/0323699 A1 | 12/2010 | Hashimoto | |
| 2013/0064173 A1* | 3/2013 | Sivavakeesar | H04B 7/2606 |
| | | | 370/315 |
| 2014/0206368 A1 | 7/2014 | Maltsev et al. | |
| 2016/0100347 A1 | 4/2016 | Ryu | |
| 2018/0132159 A1* | 5/2018 | Strong | H04W 24/02 |
| 2018/0279130 A1* | 9/2018 | Huang | H04W 24/02 |
| 2018/0331828 A1* | 11/2018 | Pakkan | H04L 41/0876 |
| 2018/0343685 A1* | 11/2018 | Hart | H04W 48/20 |

FOREIGN PATENT DOCUMENTS

| | | |
|---|---|---|
| EP | 2265053 A1 | 12/2010 |
| EP | 2770778 A2 | 8/2014 |
| JP | 2011530216 A | 12/2011 |
| WO | 2010014559 A2 | 2/2010 |
| WO | 2017-161361 A2 | 9/2017 |

\* cited by examiner

COMMUNICATION APPARATUS, CONTROL METHOD, AND COMPUTER-READABLE STORAGE MEDIUM

BACKGROUND

Field

The present disclosure relates to establishment of links to be used for communication.

Description of the Related Art

There is a technique for comprehensively handling a plurality of networks as a single network, in which the plurality of networks are constructed by a respective plurality of access points (APs), and the plurality of access points are part of the single network and operate as network-constructing base stations of the single network. Such a comprehensive network including networks constructed by a plurality of APs can be referred to as a multi-AP (MAP) network. A MAP network can include a control apparatus controlling the entire MAP network. Such a control apparatus is referred to as a MAP controller (or controller). APs that belong to the MAP network and are controlled by such a MAP controller are referred to as MAP agents (or agents).

The controller and an agent, or an agent and another agent, can establish a communication link called a backhaul link and perform backhaul communication using the established backhaul link. The controller can implement efficient network control between the plurality of agents belonging to the MAP network by using information obtained from the agents belonging to the MAP network, via backhaul communication.

International PCT Application Publication No. 2017-161361 discusses control of a network including a plurality of agents connected via backhaul communication.

Some APs operating as agents in a MAP network can have a plurality of wireless interfaces (I/Fs) and simultaneously construct wireless networks in a plurality of frequency bands. An AP that can simultaneously construct a plurality of wireless networks in a plurality of frequency bands can sometimes establish a plurality of backhaul links for backhaul communication with another AP.

SUMMARY

According to various embodiments of the present disclosure, there is provided a communication apparatus including: a communication unit configured to communicate with a base station having a function of constructing a network; a control unit configured to control a network including a plurality of base stations including the base station, with which communication is performed by using the communication; and a first transmission unit configured to transmit a message to a first base station and/or second base stations included in the network controlled by the control unit so that a plurality of links to be used for communication is established between the first base station and the second base station.

Further features of various embodiments of the present disclosure will become apparent from the following description of exemplary embodiments with reference to the attached drawings.

DESCRIPTION OF THE EMBODIMENTS

Exemplary embodiments will be described in detail below with reference to the accompanying drawings. Configurations described in the following exemplary embodiments are just examples, and it is noted that the present invention is not limited to the illustrated configurations.

Figure 1:
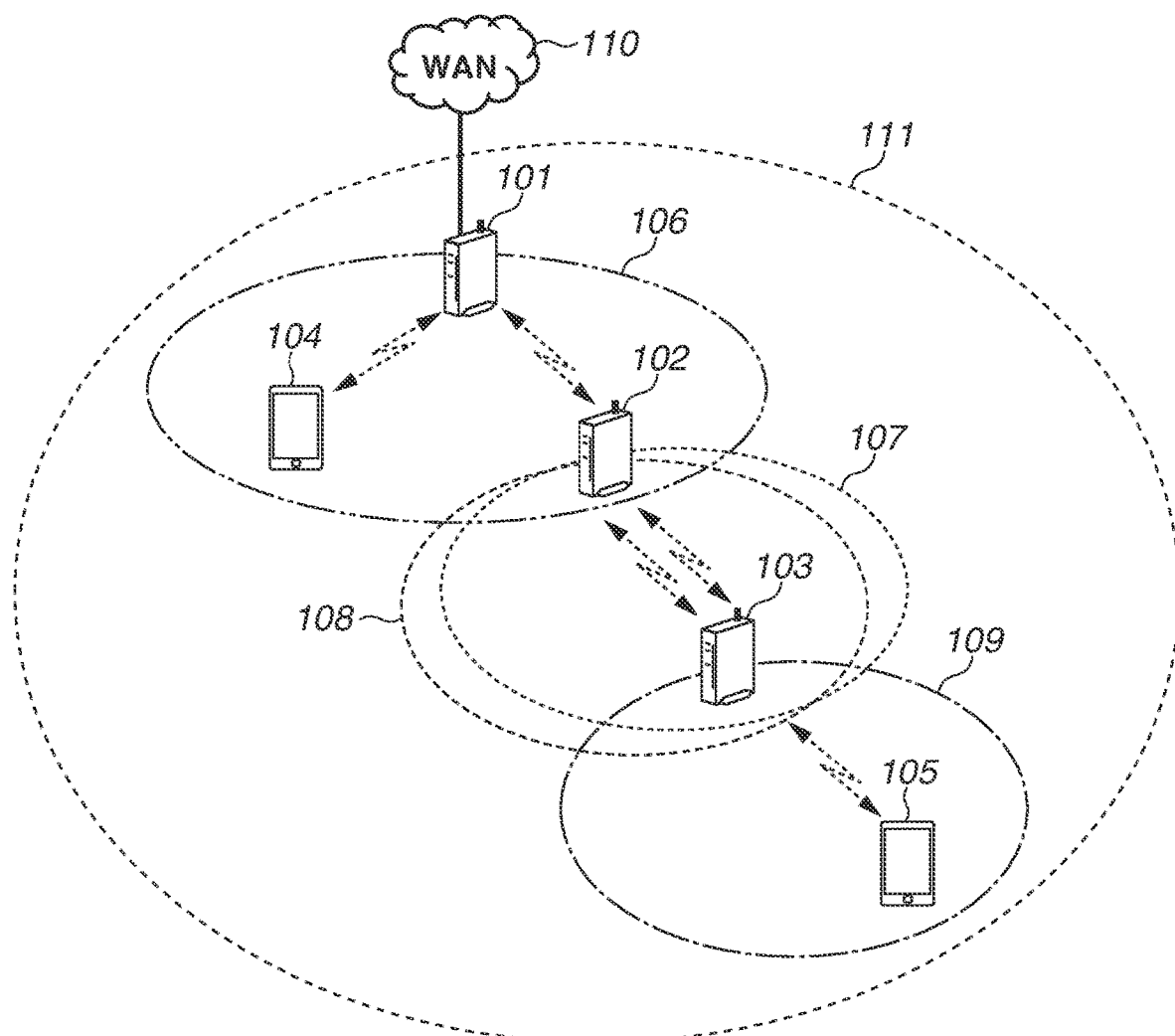
FIG. 1 is a diagram illustrating a configuration of a network that an access point (AP) 101, an AP 102, and an AP 103 join according to one embodiment.

FIG. 1 illustrates a configuration of a network an access point (AP) 101 joins according to one exemplary embodiment. The AP 101, an AP 102, and an AP 103 are APs each having a function of constructing a network (basic service set (BSS)). The AP 101 constructs a network 106, the AP 102 constructs networks 107 and 108, and the AP 103 constructs a network 109. Stations (STAs) 104 and 105 have a function of joining a network. The STA 104 joins the network 106, and the STA 105 the network 109. The AP 101 is connected to a wide area network (WAN) 110 and can communicate with external networks such as the Internet.

In the present exemplary embodiment, the networks 106, 107, 108, and 109 are wireless local area network (LAN) networks compliant with the Institute of Electrical and Electronics Engineers (IEEE) 802.11 series standards. Specifically, each network supports at least any one of the IEEE 802.11a/b/g/n/ac/ax/be standards.

Each network may support other communication standards in addition to the IEEE 802.11 series standards. Examples include Bluetooth (registered trademark), near field communication (NFC), ultra wideband (UWB), Zig-Bee, and Multi Band Orthogonal frequency-division multiplexing (OFDM) Alliance (MBOA). UWB includes wireless Universal Serial Bus (USB), wireless 1394, and WiNET. Each network may also support the Wi-Fi Direct standard formulated by Wi-Fi Alliance in addition to the IEEE 802.11 series standards. Communication standards for wired communication such as a wired LAN may also be supported.

In the present exemplary embodiment, the AP 102 includes a plurality of wireless interfaces and can simultaneously construct a plurality of networks (for example, networks 107 and 108). In such a case, the networks 107 and 108 use different frequency bands. For example, the network 107 uses a 2.4-GHz band, and the network 108 a 5-GHz band. Alternatively, the networks 107 and 108 can use channels with a lower interference power in the same frequency band. For example, if the network 107 uses channels belonging to W52 in the 5-GHz band, the network 108 can use channels belonging to W53. In such a manner, the AP 102 can simultaneously maintain a plurality of networks.

In the present exemplary embodiment, the APs 101, 102, and 103 support the Wi-Fi EasyMesh standard. In such a case, a comprehensive network of the networks 106, 107, 108, and 109 will be referred to as a multi-AP (MAP) network 111. The MAP network 111 is a network including the APs 101, 102, and 103. The AP 101 operates as a MAP controller (controller) playing the role of controlling the entire MAP network 111. The APs 102 and 103 operate as MAP agents (agents) playing the role of operating in the MAP network 111 based on control instructions from the controller. The AP 101 may have not only a controller function but also an agent function. In such a case, control processing between the controller and agent of the AP 101 is performed by internal data exchange. In the present exemplary embodiment, the controller of the MAP network 111 will be described as having an AP function as well. However, this is not restrictive, and in other embodiments the controller may be without the AP function.

The AP 101, which is the controller, and the APs 102 and 103 which are agents can communicate via the MAP network 111. Specifically, the AP 102 which is an agent has a backhaul STA function for joining, as an STA, a network 106 constructed by the AP 101 which is the controller. The AP 101 which is the controller and the AP 102 which is an agent can communicate by the AP 102 joining the network 106 constructed by the AP 101 by using the backhaul STA function. A function by which the AP 102 serving as an AP connects to an STA is referred to as a fronthaul AP function. The AP 103 can communicate with the AP 101 via the AP 102 by the AP 103 joining, as an STA, the network 107 constructed by the AP 102. In such a manner, the APs 102 and 103 which are agents can join the MAP network 111 by constructing a network as an AP while joining, as an STA, a network constructed by another AP. The network constructed by another AP for the AP 102 or 103 which is an agent to join as an STA is referred to, when seen from the perspective of the AP 102 or the AP 103, as a backhaul BSS. By contrast, the network that the AP 102 or the AP 103 serving as an AP has an STA or another AP join is referred to, when seen from the perspective of the AP 102 or the AP 103, as a fronthaul BSS. In other words, the same network is referred to as a fronthaul BSS when seen from the perspective of the AP constructing the network, and a backhaul BSS when seen from the perspective of the AP joining the network.

A link that an AP serving as an agent establishes in joining a network constructed by another AP, and is used for communication with the AP, is referred to as a backhaul link. From the viewpoint of the AP that establishes the backhaul link with the AP joining the network constructed by the own apparatus, the backhaul link is established via a fronthaul BSS. By contrast, from the viewpoint of the AP that joins the network constructed by another AP and establishes the backhaul link to the AP, the backhaul link is established via a backhaul BSS.

The controller and an agent may distinguish a network that ordinary STAs join from a network that the agent joins, or regard the networks as the same one.

A link that an agent or the controller establishes to an STA is referred to as a fronthaul link.

The AP 101, which is the controller, manages and controls the agents and STAs in the MAP network 111. For example, the AP 101, which is the controller, can control frequency channels and transmission power of the networks established by the APs 102 and 103, which are agents, by transmitting predetermined control messages via the backhaul links. In addition or instead, the AP 101, which is the controller, can make the AP 102 or 103, which is an agent, migrate to a different network. In addition or instead, the AP 101 can control STA steering. For example, the AP 101 can perform roaming to change the connection destination of the STA 105 belonging to the network 109 constructed by the AP 103 belonging to the MAP network 111 to the network 106 constructed by the AP 101. In addition or instead, the AP 101 can control AP-to-STA or AP-to-AP data traffic and diagnose each network. In addition or instead, the AP 101 can obtain network-related information from the APs 102 and 103 which are agents via the backhaul links.

The APs 102 and 103, which are agents, can notify the AP 101, which is the controller, of network-related information (network information) via the backhaul links. Examples of the network information notified by the APs 102 and 103 include capability information (such as HT capability and VHT capability) about the agents themselves and capability information about STAs and APs connected to the agents. Alternatively, the APs 102 and 103 may notify the controller of information about the agents' own wireless interfaces (I/Fs) as the capability information about the agents. Examples of the information about the wireless I/Fs include the Media Access Control (MAC) addresses of the wireless I/Fs included in the agents, and wireless LAN communication methods supported by the agents. If an agent includes a plurality of wireless I/Fs, the agent may notify the controller of information about each of the wireless I/Fs, or only information about some of the wireless I/Fs. If an agent includes not only a wireless I/F or I/Fs but a wired I/F as well, capability information about the wired I/F may be included. Examples of the capability information about a wired I/F can include the MAC address of the wired I/F and information about a physical link rate of wired communication, for example.

Control instructions from the AP 101, which is the controller, are transmitted to and received by the agents (APs 102 and 103) via the backhaul links. In the present exemplary embodiment, backhaul links are established and used for communication between the APs 101 and 102 and between the APs 102 and 103. Specifically, the AP 102 can connect, as a backhaul STA, to the network 106 constructed by the AP 101 while constructing the networks 107 and 108. In such a case, the network 106 seen from the perspective of the AP 101 is called a fronthaul BSS, and the network 106 seen from the perspective of the AP 102 a backhaul BSS. A backhaul link is established between the APs 101 and 102 via the network 106. Similarly, the AP 103 can connect, as a backhaul STA, to at least either one of the networks 107 and 108 constructed by the AP 102 while constructing the network 109. In such a case, the networks 107 and 108 seen from the perspective of the AP 102 are called fronthaul BSSs, and the networks 107 and 108 seen from the perspective of the AP 103 backhaul BSSs. A backhaul link is thereby established between the APs 102 and 103. In the present exemplary embodiment, backhaul links via the respective networks 107 and 108 may be established between the APs 102 and 103. That is, a plurality of backhaul links may be established between the APs 102 and 103. In such a case, the networks 107 and 108 use frequency bands with a lower interference power. For example, either one of the networks 107 and 108 uses a 2.4-GHz frequency band, and the other a 5-GHz frequency band.

In the present exemplary embodiment, an AP is described as an example of the apparatus having the controller function. However, this is not restrictive, and communication apparatuses such as a personal computer (PC), a tablet, a smartphone, a mobile phone, and a television set may be used. The same applies to the apparatuses having the agent function. None of such apparatuses is restrictive, as long as a hardware configuration illustrated in FIG. 2 is satisfied.

Figure 2:
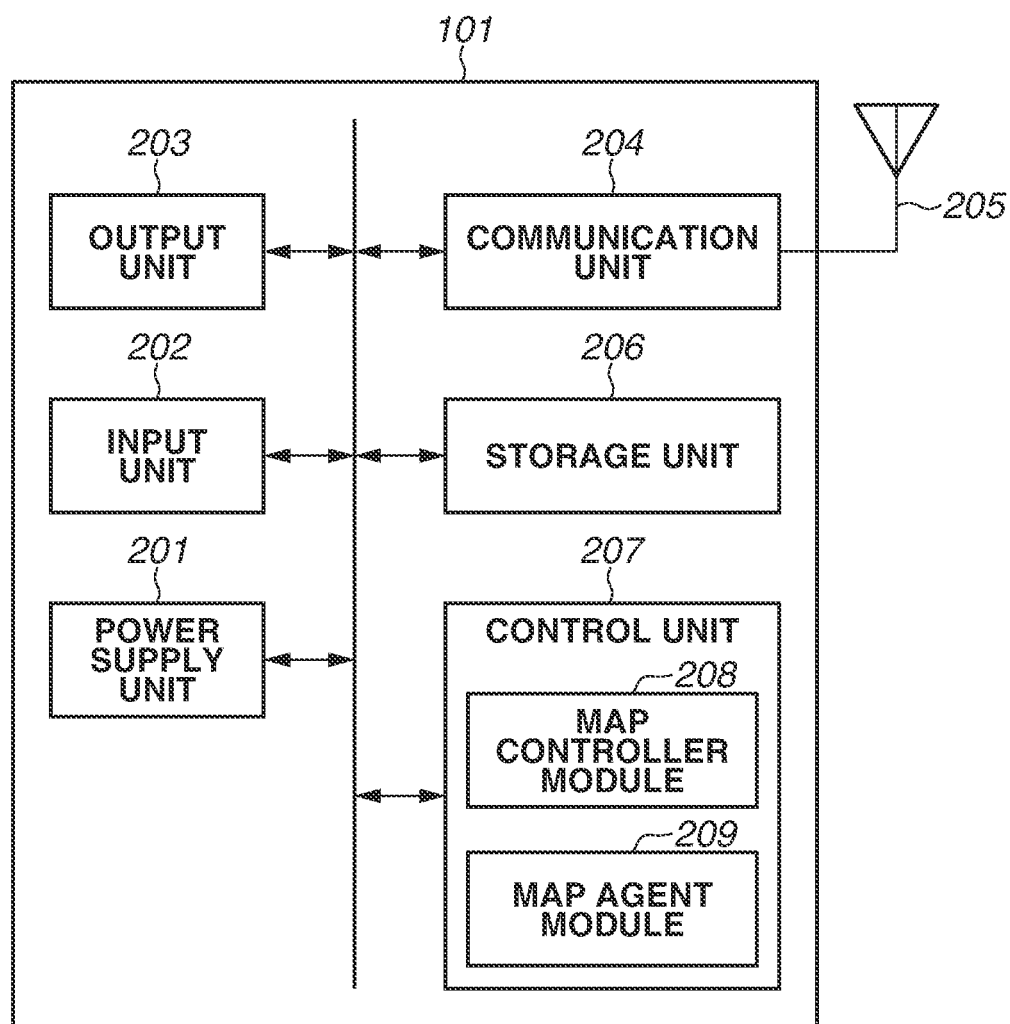
FIG. 2 is a diagram illustrating a hardware configuration of the AP 101 according to one embodiment.

FIG. 2 illustrates a hardware configuration of the AP 101. The AP 101 includes a power supply unit 201, an input unit 202, an output unit 203, a communication unit 204, an antenna 205, a storage unit 206, and a control unit 207.

The power supply unit 201 is a power supply unit that supplies power to various pieces of hardware to be described below. The power supply unit 201 obtains power from an alternating-current (AC) power source or a battery, for example.

The input unit 202 accepts various operations from a user. For example, the input unit 202 includes modules such as a button and a keyboard. The output unit 203 makes various outputs to the user. Examples of the outputs made by the output unit 203 include at least one of the following: a light-emitting diode (LED) indication, a screen display, an audio output from a speaker, and a vibration output. Both the input unit 202 and the output unit 203 may be implemented by one module, such as a touch panel. The input unit 202 and the output unit 203 each may be integrated with or separate from the AP 101.

The communication unit 204 controls wireless communication compliant with the IEEE 802.11 series standards. In addition or instead, the communication unit 204 may control wired communication such as a wired LAN communication compliant with and defined by the IEEE 802.3, and/or Internet Protocol (IP) communication. The communication unit 204 transmits and receives wireless signals via the antenna 205. If the AP 101 can simultaneously construct a plurality of networks, the AP 101 may include a plurality of communication units 204 and antennas 205.

The communication unit 204 includes a wireless I/F. The wireless I/F includes a radio frequency (RF) circuit and a wireless LAN chip. The communication unit 204 may include a plurality of wireless I/Fs. For example, the communication unit 204 may include a wireless I/F corresponding to a 2.4-GHz band and a wireless I/F corresponding to a 5-GHz band. In the present exemplary embodiment, the AP 101 includes one wireless I/F, and the APs 102 and 103 include two wireless I/Fs each.

The storage unit 206 includes one or more memories such as a read-only memory (ROM) and a random access memory (RAM), and stores computer programs for performing various operations to be described below and various types of information such as communication parameters for wireless communication. Aside from a ROM and a RAM, a storage medium such as a flexible disk, a hard disk, an optical disc, a magneto-optical disc, a compact disc read-only memory (CD-ROM), a compact disc recordable (CD-R), a magnetic tape, a nonvolatile memory card, and a digital versatile disc (DVD) may be used as the storage unit 206. The storage unit 206 includes a plurality of memories and storage media.

The control unit 207 includes one or more processors such as a central processing unit (CPU) and a microprocessing unit (MPU), and controls the entire AP 101 by executing the computer programs stored in the storage unit 206. The control unit 207 may be configured to control the entire AP 101 by cooperation of the computer programs and an operating system (OS) stored in the storage unit 206. The control unit 207 generates data and signals to be transmitted during communication with other communication apparatuses. The control unit 207 may include a plurality of processors such as a multicore processor, and control the entire AP 101 by the plurality of processors.

The control unit 207 executes a program, which is stored in the storage unit 206, for causing the control unit 207 to function as a MAP controller module 208 and a MAP agent module 209. The MAP controller module 208 is a program for causing the AP 101 to operate as the controller of the MAP network 111. The MAP agent module 209 is a program for causing the AP 101 to operate as an agent in the MAP network 111. If the AP 101 plays both the roles of the controller and an agent, the functions of both the MAP controller module 208 and the MAP agent module 209 are executed. If the AP 101 plays only the role of the controller, i.e., does not play the role of an agent, only the function of the MAP controller module 208 is executed. In such a case, the function of the MAP agent module 209 may be deactivated. Similarly, if the AP 101 plays only the role of an agent, i.e., does not play the role of the controller, only the function of the MAP agent module 209 is executed. In such a case, the function of the MAP controller module 208 may be deactivated.

By executing a program stored in the storage unit 206, the control unit 207 performs processing for setting wireless LAN parameters compliant with Wi-Fi Protected Setup (WPS) to establish a backhaul link. WPS is a standard formulated by Wi-Fi Alliance. The AP 101 can share communication parameters for establishing a backhaul link with another AP by performing parameter setting processing compliant with WPS. The communication parameters include at least any one of the following: a service set identifier (SSID), an encryption method, an encryption key, an authentication method, and an authentication key. Information about the frequency band to be used may be included in addition to the communication parameters. By executing a program stored in the storage unit 206, the control unit 207 can also perform communication parameter setting processing compliant with Device Provisioning Protocol (DPP) of higher security in addition to or instead of WPS. DPP is a standard formulated by Wi-Fi Alliance.

The APs 102 and 103 also have a hardware configuration similar to that of the AP 101. The APs 102 and 103 do not need to have the controller function. In such a case, the control unit 207 does not need to include the function of the MAP controller module 208.

Figure 3:
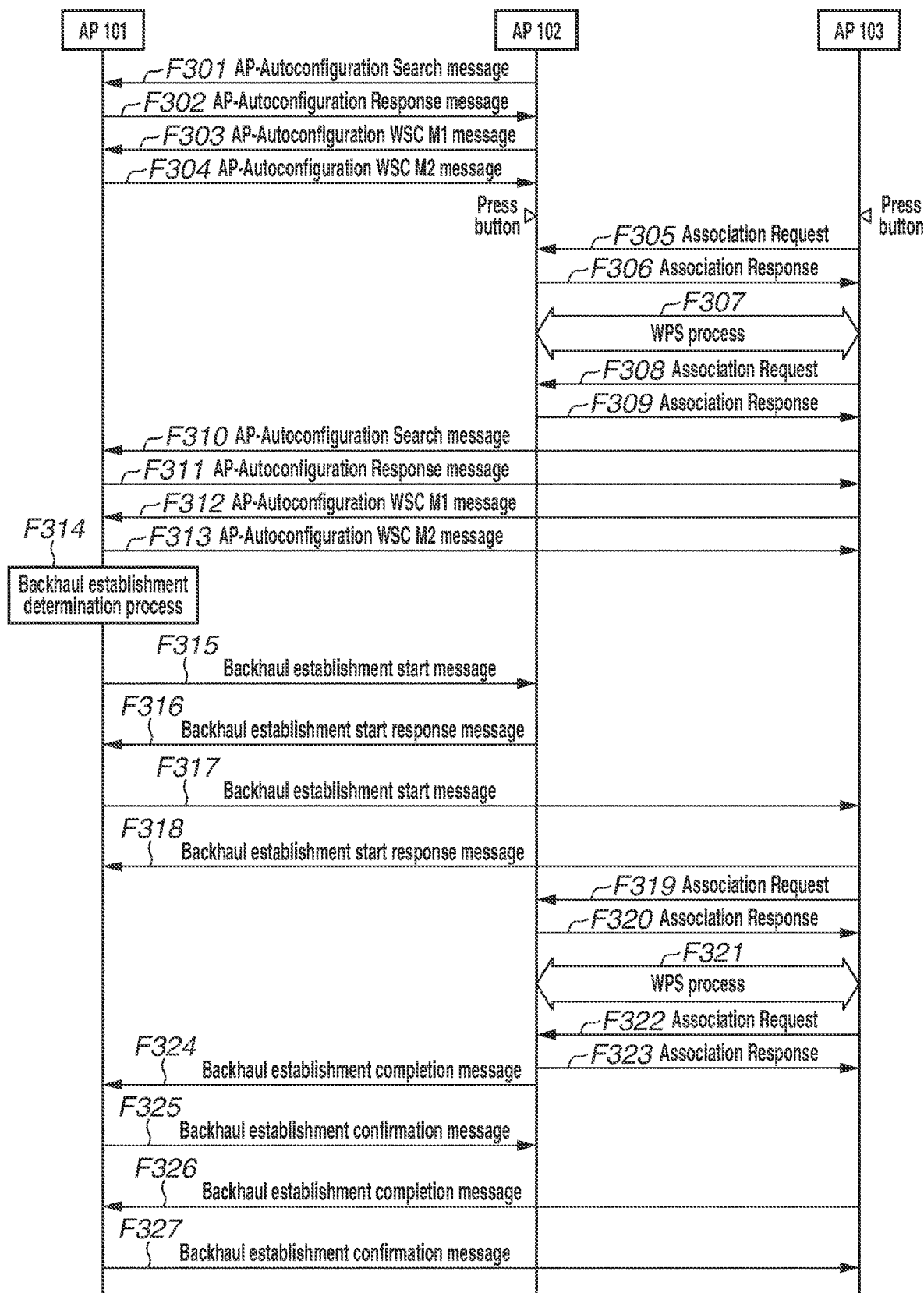
FIG. 3 is a sequence diagram illustrating an example of processing performed in a case where the APs 102 and 103 establish a plurality of backhaul links between each other according to one embodiment.

FIG. 3 is a sequence diagram illustrating an example of processing performed in a case where the APs 102 and 103 establish a plurality of backhaul links.

In the present exemplary embodiment, the AP 102 initially connects, as a backhaul STA, to the network 106 constructed by the AP 101, establishes a backhaul link, and is registered as an agent in the AP 101. A MAP network 111 including the APs 101 and 102 is thereby constructed. Next, to join the MAP network 111, the AP 103 connects to the network 107 constructed by the AP 102 and establishes a backhaul link to the AP 102. With the backhaul link to the AP 102 established, the AP 103 is registered as an agent in the AP 101 via the AP 102. A second backhaul link is then established between the APs 102 and 103 via the network 108 by control of the AP 101 which is the controller. Such a sequence will be described with reference to the sequence diagram illustrated in FIG. 3.

This sequence is started in a state where the AP 102 belongs, as a backhaul STA, to the network 106 constructed by the AP 101. In step F301, the AP 102 having joined the network 106 multicasts an IEEE 1905.1 AP-Autoconfiguration Search message as a search signal for searching for a controller.

In step F302, if the AP 101 receiving the search signal transmitted from the AP 102 is operating as a controller, the AP 101 transmits an AP-Autoconfiguration Response message to the AP 102 as a response signal.

In step F303, the AP 102 receiving the response signal transmits an AP-Autoconfiguration WSC message to the AP 101 as a registration request signal for registering the AP 102 in the AP 101 which is the controller. This message includes a message corresponding to an M1 message compliant with the Wi-Fi Simple Configuration (WSC) standard. Specifically, the message includes information such as the MAC address and device name of the AP 102. In addition, the registration request signal includes capability information about wireless communication of the AP 102. Specifically, information about a usable frequency band or bands of the AP 102 (at least either one of 2.4- and 5-GHz bands) and information about usable frequency channels are included as the capability information about wireless communication. In addition to or instead of such information, an identifier for uniquely identifying the network 106 the AP 102 belongs to in the MAP network 111 may be included.

The registration request signal may be extended to include information about the wireless I/F that can operate as a backhaul STA in the AP 102. A specific example of the information about the wireless I/F is the MAC address of the wireless I/F. The registration request signal may also be extended to include information about a BSS other APs can join among fronthaul BSSs that can be constructed by the AP 102. A specific example of the information about the BSS is a basic service set identifier (BSSID) of the BSS. Information indicating whether the BSS other APs can join is already constructed may be included as the information about the BSS. The registration request signal may be further extended to include capability information about whether the AP 102 can simultaneously establish a plurality of backhaul links.

In step F304, the AP 101 receiving the registration request signal transmits an AP-Autoconfiguration WSC message to the AP 102 as a registration response signal. If the AP 101 succeeds in registering the AP 102 as an agent, a message corresponding to a WSC M2 message is included in the registration response signal. In such a case, the registration response signal includes the device name of the AP 101 and information indicating the absence of an error. The registration response signal also includes an identifier for uniquely identifying the network 106 in the MAP network 111. The identifier included in the registration response signal may be the same as that included in the registration request signal. If any error occurs and the AP 101 fails to register the AP 102, a registration response signal indicating the occurrence of the error is transmitted.

The AP 102 may give the user a notification corresponding to the registration response signal received from the AP 101 in step F304. For example, if a registration response signal including information indicating the absence of an error is received, the AP 102 notifies the user of the successful registration. Alternatively, the AP 102 may notify the user of having joined the MAP network 111. On the other hand, if a registration response signal including information indicating the occurrence of an error is received, the AP 102 notifies the user of the registration failure. Alternatively, the AP 102 may notify the user of the failure to join the MAP network 111. If the registration response signal includes information indicating the cause of the error, the AP 102 may notify the user of the cause of the error.

In the present exemplary embodiment, the information about the wireless I/F of the AP 102 and the information about the BSS other APs can join are described to be included in the registration request signal transmitted from the AP 102. However, this is not restrictive. The AP 101 may obtain such information from the AP 102 by transmitting a query message for inquiring such information of the AP 102 after the completion of the processing up to step F304, and receiving a corresponding response message. Similarly, the AP 101 may also obtain the capability information about whether the AP 102 can simultaneously establish a plurality of backhaul links by transmitting a query message and receiving a corresponding response message.

If there is a version or versions capable of establishing a plurality of backhaul links among a plurality of versions of the Wi-Fi EasyMesh standard, the AP 101 may inquire the version of the standard supported by the AP 102. In such a case, the AP 101 can determine whether the AP 102 can establish a plurality of backhaul links based on the information about the version of the Wi-Fi EasyMesh standard supported by the AP 102.

By the processing described above, the AP 102 is registered in the AP 101, which is the controller, as an agent of the MAP network 111. In addition, the AP 101 can obtain the information about the wireless I/F of the AP 102 and the BSS other APs can join, and the capability information about the establishment of a plurality of backhaul links by the AP 102.

Next, the APs 102 and 103 establish a backhaul link therebetween. Here, processing for establishing a link between agents at Layer 2 (data link layer) of the Open Systems Interconnection (OSI) model is referred to as an on-boarding process. The AP 103 can be added to the MAP network 111 by performing an on-boarding process between the APs 102 and 103. In the sequence illustrated in FIG. 3, the on-boarding process is performed by a method compliant with the WPS standard.

To start the on-boarding process between the APs 102 and 103, the user initially presses buttons on the respective APs 102 and 103. The buttons can also be used for communication parameter setting processing using a push button configuration (PBC) method compliant with the WPS standard.

When the buttons are pressed, the APs 102 and 103 start the on-boarding process using a method compliant with the WPS standard. The AP 102 initially transmits a beacon including information indicating that a WPS process is started. The AP 103 detects the AP 102 as an AP performing WPS by receiving the beacon transmitted from the AP 102. Alternatively, the AP 103 may detect the AP 102 by transmitting a Probe Request and receiving a corresponding Probe Response from the AP 102.

In step F305, the AP 103 detecting the AP 102 as an AP performing WPS transmits an Association Request to the AP 102. The AP 103 here transmits an Association Request accompanied by a MAP information element (MAP IE). The MAP IE is an information element compliant with the Wi-Fi EasyMesh standard, and includes information indicating that the AP 103 is transmitting the Association Request as a backhaul STA.

In step F306, the AP 102 receiving the Association Request transmits an Association Response to the AP 103 as a response. The Association Response also includes a MAP IE. The MAP IE transmitted from the AP 102 includes information indicating that the connected network 107 is a BSS to which other APs can connect.

The APs 102 and 103 may respectively transmit an Association Request and an Association Response including information indicating whether the own apparatus can establish a plurality of backhaul links.

In step F307, the AP 103 receiving the Association Response performs a WPS process with the AP 102 to share the communication parameters of a fronthaul BSS of the AP 102 that the AP 103 can join. In the present exemplary embodiment, the AP 102 here provides the AP 103 with the communication parameters of the network 107 as the communication parameters of the fronthaul BSS of the AP 102 that the AP 103 can join. The wireless LAN frames transmitted and received in the WPS process includes a MAP IE. When seen from the perspective of the AP 103, the network 107 is called a backhaul BSS.

When the AP 103 shares the communication parameters with the AP 102 by the WPS process, the communication link between the APs 102 and 103 is once disconnected. In step F308, the AP 103 transmits an Association Request to the AP 102 by using the communication parameters of the fronthaul BSS of the AP 102 obtained by the WPS process.

In step F309, the AP 102 receiving the Association Request transmits an Association Response to the AP 103 as a response. The Association Request and Association Response transmitted are each accompanied by the MAP IE. By such processing, a backhaul link is established between the APs 102 and 103. The backhaul link then can be encrypted by a 4-way handshake as appropriate.

Next, the agent AP 103 is registered in the AP 101 which is the controller. Specifically, the AP 103 searches for the controller and transmits a registration request. The processing of steps F310 to F313 is similar to that of the foregoing steps F301 to F304. A description thereof will thus be omitted. Like the AP 102, the AP 101 obtains the information about the wireless I/F of the AP 103 and a BSS other APs can join, and the capability information about the establishment of a plurality of backhaul links by the AP 103.

In the present exemplary embodiment, suppose that the AP 101 successfully obtains the information about the wireless I/Fs of the APs 102 and 103 and BSSs other APs can join, and the capability information about the establishment of a plurality of backhaul links. In step F314, the AP 101 performs processing for determining whether to establish a plurality of backhaul links between the APs 102 and 103. Details of the determination process (backhaul establishment determination process) performed by the AP 101 will be described below with reference to FIG. 5. Suppose here that the AP 101 determines to establish a plurality of backhaul links between the APs 102 and 103.

In step F315, the AP 101 transmits a backhaul establishment start message which is a start message (start request) intended to start establishing a plurality of backhaul links to the AP 102 based on the determination result. The backhaul establishment start message includes information indicating the network specified as a BSS to be used in establishing a backhaul link. Specifically, the backhaul establishment start message includes the BSS ID of the specified network. Alternatively, an identifier that can uniquely identify the specified network between the APs 101 and 102 may be included. In the present exemplary embodiment, the network 108 constructed by the AP 102 is specified as the network to be used in establishing a backhaul link. The network 108 is called a fronthaul BSS when seen from the perspective of the AP 102, and a backhaul BSS when seen from the perspective of the AP 103. In addition, information indicating the frequency band and frequency channels to be used by the specified network may also be included. If the establishment of a new backhaul link involves communication parameter setting processing between the APs 102 and 103, the start request may include information specifying the method of the setting processing. A WPS method or DPP method is selected as the method of the communication parameter setting processing. If the network to be used to establish a new backhaul link is determined to be not constructed yet based on the information obtained from the AP 102, the start request may include information for giving an instruction to construct the network.

The AP 102 receiving the start request from the AP 101 determines whether a backhaul link can be established via the specified network. In step F316, the AP 102 transmits a backhaul establishment start response message which is a start response message including information indicating the determination result to the AP 101. An example of the case where the backhaul link is determined unable to be established via the specified network will now be described. If a communication parameter setting process using the WPS method is necessary for the establishment of the backhaul link and the AP 102 is already performing the communication parameter setting process using the WPS method with another apparatus, the backhaul link is determined unable to be established. Note that the case where the AP 102 determines that the backhaul link is unable to be established is not limited thereto.

If the backhaul establishment start response message received from the AP 102 includes information indicating that the AP 102 can establish the backhaul link, then in step F317, the AP 101 transmits a start message to the AP 103 as well. The start message transmitted to the AP 103 here is similar to that transmitted to the AP 102 in step F315. Instead of or in addition to the information included in the start message transmitted in step F315, information for specifying a wireless I/F to operate as a backhaul STA in the AP 103 may be included.

The AP 103 receives the backhaul establishment start message, and determines whether a backhaul link can be established like the AP 102. In step F318, the AP 103 transmits a backhaul establishment start response message including the determination result to the AP 101. Suppose here that the AP 103 transmits a backhaul establishment start response message indicating that a backhaul link can be established to the AP 101.

If the start response message received from the AP 103 includes the information indicating that a backhaul link can be established, the AP 101 waits until a new backhaul link is established between the APs 102 and 103. If the received start response message includes information indicating that the AP 103 is unable to establish the backhaul link, the AP 101 transmits a message for cancelling the establishment of the backhaul link to the AP 102. In such a case, the processing for establishing the second backhaul link between the APs 102 and 103 is stopped. This is not restrictive, and the AP 101 may transmit a backhaul establishment start message to the AP 103 again after a lapse of a certain time.

In the present exemplary embodiment, the backhaul establishment start messages are successively transmitted to the APs 102 and 103 in steps F315 and F317. However, the order is not limited thereto. The backhaul establishment start messages may be simultaneously transmitted to the APs 102 and 103 or transmitted in reverse order. Alternatively, a backhaul establishment start message may be broadcast or multicast in the MAP network 111.

Meanwhile, after the APs 102 and 103 transmit the start response messages indicating that a backhaul link can be established in steps F316 and F318, respectively, the APs 102 and 103 start processing for establishing the backhaul link. If the AP 102 has not constructed the specified network yet, the AP 102 initially constructs the network. In the present exemplary embodiment, the specified network is the network 108. In steps F319 to F323, the APs 102 and 103 perform processing similar to the on-boarding process performed in the foregoing steps F305 to F309 on the network 108.

If the APs 102 and 103 complete the on-boarding process and the second backhaul link is established between the APs 102 and 103, then in step F324, the AP 102 transmits a backhaul establishment completion message to the AP 101. In step F326, the AP 103 similarly transmits a backhaul establishment completion message to the AP 101.

In steps F325 and F327, the AP 101 receiving the backhaul establishment completion messages transmits a backhaul establishment confirmation message to the APs 102 and 103. The backhaul establishment confirmation message may include an identifier that uniquely identify the established new backhaul link in the MAP network 111. The AP 101 can subsequently instruct the agents to control the backhaul link by using the identifier.

If the backhaul link fails to be established, a backhaul establishment error message including information indicating the failure of the establishment of the backhaul link may be transmitted to the AP 101 instead of the backhaul establishment completion message. If the AP 101 receives the backhaul establishment error message from at least either one of the APs 102 and 103, the AP 101 transmits a stop message for stopping the establishment of the backhaul link to the APs 102 and 103.

While the backhaul establishment completion message and the backhaul establishment error message are described to be transmitted from both the APs 102 and 103 to the AP 101, this is not restrictive and the messages may be transmitted from only either one of the APs 102 and 103.

In the present exemplary embodiment, the messages communicated in steps F315 to F318 and F324 to F327 are transmitted in a format compliant with the IEEE 1905.1 standard. However, this is not restrictive and the messages may be in other formats.

By the foregoing processing, a plurality of backhaul links can be established between the APs 102 and 103. As described above, in establishing a plurality of backhaul links between agents, the controller can control the establishment of the plurality of backhaul links by the controller giving instructions to establish the backhaul links.

As illustrated in FIG. 3, the establishment of the second backhaul link between the APs 102 and 103 is triggered by the backhaul establishment start messages transmitted from the AP 101. This is convenient for the user since the user does not need to press the buttons on the APs 102 and 103 in establishing the second backhaul link between the APs 102 and 103.

In FIG. 3, the APs 102 and 103 perform a communication parameter sharing process using the WPS method each time a backhaul link is established. However, this is not restrictive. The APs 102 and 103 may share the communication parameters to be used in establishing another backhaul link during the initial sharing process (steps F305 to F309). In such a case, the APs 102 and 103 may omit the processing of step F321.

Figure 4:
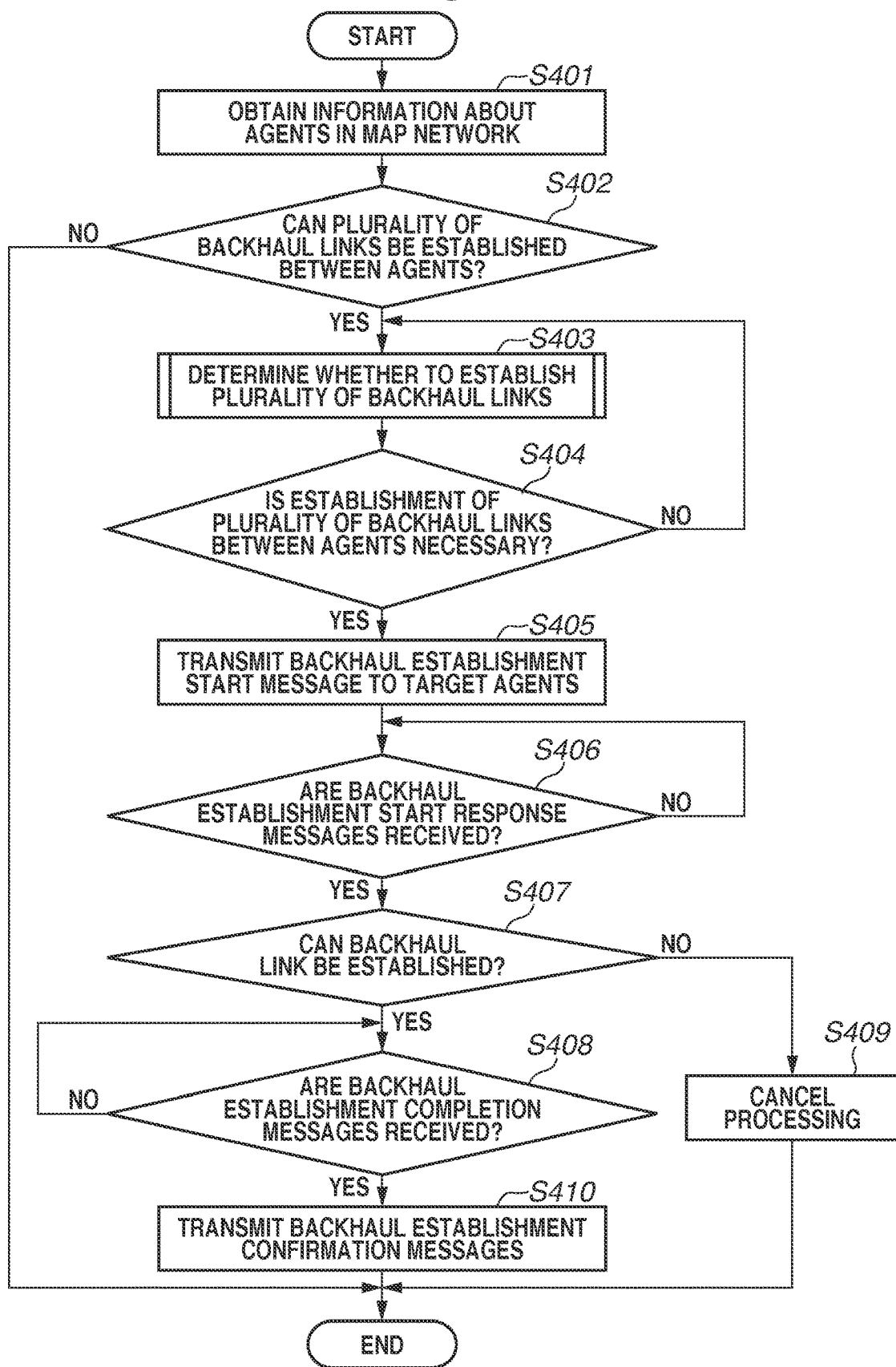
FIG. 4 is a flowchart illustrating an example of processing performed by the AP 101 in establishing a plurality of backhaul links between the APs 102 and 103 according to one embodiment.

FIG. 4 is a flowchart illustrating processing performed when the AP 101 establishes a plurality of backhaul links between other APs. The processing is performed by the control unit 207 reading a computer program stored in the storage unit 206 and executing the computer program.

The AP 101 starts the processing of this flowchart when a new agent joins the MAP network 111 controlled by the AP 101. Alternatively, the AP 101 may start the processing of this flowchart based on instructions from the user or based on detection of a topological change in the MAP network 111. Alternatively, the AP 101 may start the processing of this flowchart based on a request made by an agent belonging to the MAP network 111 to establish a plurality of backhaul links.

In step S401, the AP 101 initially obtains information about the agents in the MAP network 111. The agent information obtained here is the information notified by the AP-Autoconfiguration messages illustrated in FIG. 3 (steps F303 and F312). In addition or instead, the AP 101 may obtain network information notified from the agents via backhaul links. Alternatively, the AP 101 may transmit a query message to the agents and obtain information from the agents as responses thereto. For example, the AP 101 may transmit an AP Capability Query message defined as a query message for inquiring capability information about an AP by the Wi-Fi EasyMesh standard. In such a case, the AP 101 can obtain capability information about the AP 102 by receiving an AP Capacity Report message as a response from the AP 102. This is not restrictive, and the AP 101 may obtain agent information by using other query messages as well. In the present exemplary embodiment, the AP 101 obtains agent information from all the agents joining the MAP network 111. However, this is not restrictive. The AP 101 which is the controller may obtain information only about a given agent or agents.

In step S402, the AP 101 determines whether a plurality of backhaul links can be established between two given agents in the MAP network 111. Whether an agent has the capability to establish a plurality of backhaul links is determined based on the information obtained from the agent in step S401. In the present exemplary embodiment, the AP 101 determines whether a plurality of backhaul links can be established between the APs 102 and 103. The AP 101 makes the determination based on the information about the usable frequency bands of each of the APs 102 and 103, obtained from the APs 102 and 103 in step S401. Specifically, if both the APs 102 and 103 can use both 2.4- and 5-GHz bands, the AP 101 makes a determination of YES in this step. On the other hand, if at least either one of the APs 102 and 103 can only use either one of the 2.4- and 5-GHz frequency bands, the AP 101 makes a determination of NO in this step. Instead or in addition, if the AP 101 obtains information about wireless I/Fs that can operate as backhaul STAs from the APs 102 and 103 in step S401, the AP 101 may make the determination in this step based on the information. Specifically, if both the APs 102 and 103 notify the AP 101 of wireless I/Fs other than the ones already in use as wireless I/Fs that can operate as backhaul STAs, the AP 101 makes a determination of YES in this step. On the other hand, if at least either one of the APs 102 and 103 notifies the AP 101 of only the wireless I/F already in used as a wireless I/F that can operate as a backhaul STA, or of no wireless I/F, the AP 101 makes a determination of NO in this step. Instead or in addition, if the AP 101 obtains capability information about whether a plurality of backhaul links can simultaneously be established from the APs 102 and 103 in step S401, the AP 101 may make the determination in this step based on the capability information. Specifically, if both the APs 102 and 103 can simultaneously establish a plurality of backhaul links, the AP 101 makes a determination of YES in this step. On the other hand, if at least either one of the APs 102 and 103 is unable to simultaneously establish a plurality of backhaul links, the AP 101 makes a determination of NO in this step. If the determination in this step is YES (YES in step S402), the processing proceeds to step S403. On the other hand, if the determination in this step is NO (NO in step S402), the processing ends.

In this step, the AP 101 may make the determination only on two specific agents in the MAP network 111. Alternatively, the AP 101 may make the determination on all combinations of agents having established backhaul links in the MAP network 111. If the AP 101 makes the determination on all the combinations of agents having established backhaul links, the AP 101 performs the processing of step S403 and the subsequent steps on each combination.

Figure 5:
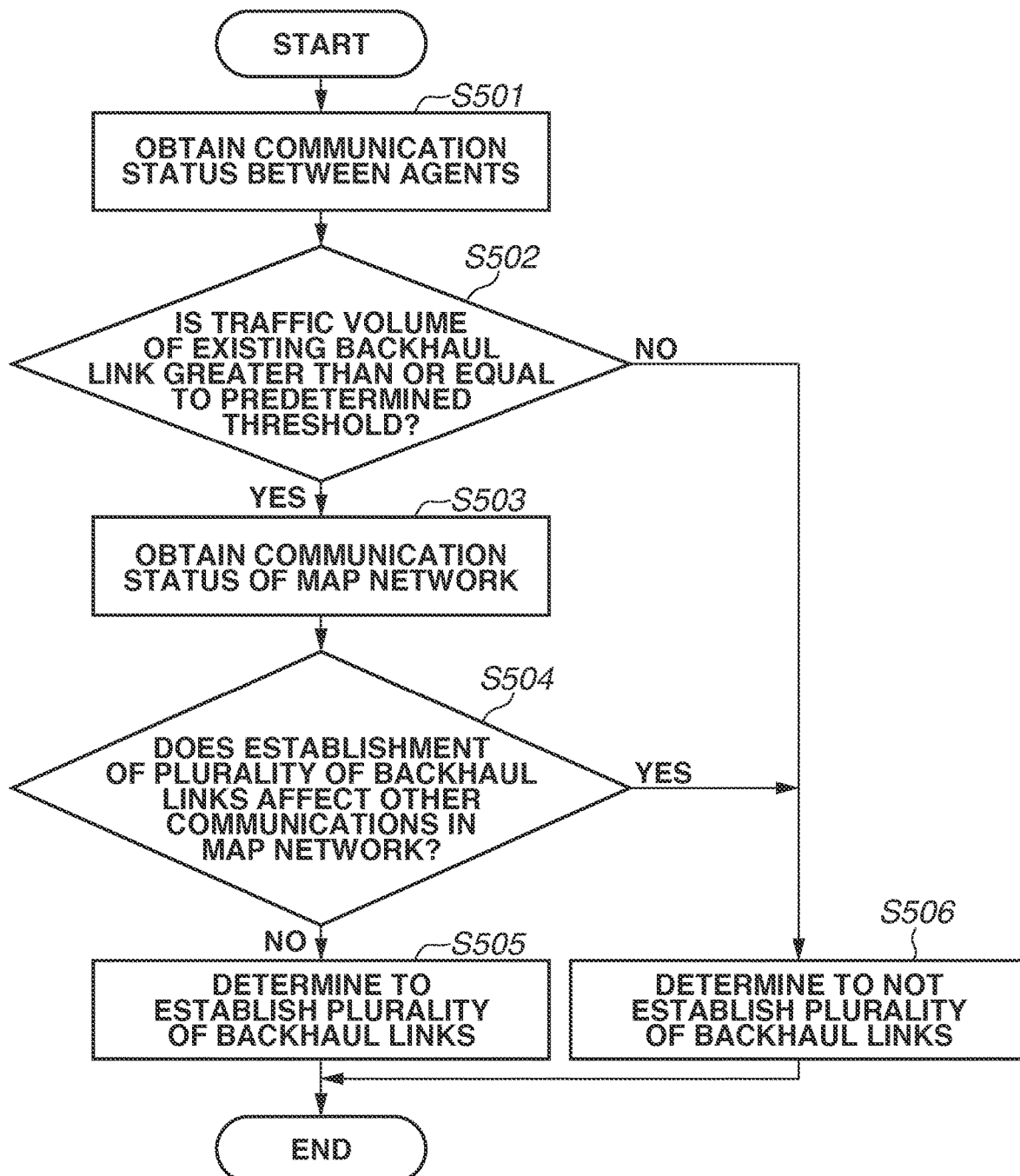
FIG. 5 is a flowchart illustrating an example of processing performed by the AP 101 in determining whether to establish a plurality of backhaul links between the APs 102 and 103 according to one embodiment.

In step S403, the AP 101 determines whether to establish a plurality of backhaul links. In this step, the AP 101 may determine whether establishment of a plurality of backhaul links is necessary between the agents on which the determination made in step S402 is YES. FIG. 5 illustrates an example of the processing in this step.

In step S501, the AP 101 obtains a communication status of the backhaul link between the two target agents. In the present exemplary embodiment, the AP 101 obtains the communication status of the backhaul link already established between the APs 102 and 103. The AP 101 obtains the communication status of the backhaul link by being notified of information about the communication status from the agents. Alternatively, the AP 101 may transmit a query message for inquiring the communication status of the backhaul link to at least either one of the APs 102 and 103 and obtain the communication status as a response message. For example, the AP 101 may obtain the communication status by transmitting a query message for inquiring link metrics information about the backhaul link and obtaining the link metrics information included in a response message. Link metrics are expressed, for example, by capability information about the throughput of at least either one of the APs 102 and 103 or information about the physical rate or traffic volume of the target backhaul link. In the present exemplary embodiment, the link metrics are expressed by a link usage rate that is information about the traffic volume of the backhaul link. In this step, the AP 101 may also obtain a radio wave condition indicated by the received signal strength indicator (RSSI) of at least either one of the APs 102 and 103 or the state of the frequency channels.

In step S502, the AP 101 determines whether the traffic volume (link usage rate) of the target backhaul link is greater than or equal to a predetermined threshold. In this step, the AP 101 determines whether to establish a plurality of backhaul links based on the communication status between the agents, obtained in step S501. In the present exemplary embodiment, since the traffic volume (link usage rate) of the backhaul link between the APs 102 and 103 is obtained as the communication status, the AP 101 makes the determination in this step based on the traffic volume (link usage rate). If the traffic volume (link usage rate) obtained in step S501 is greater than or equal to the predetermined threshold, the AP 101 makes a determination of YES in this step (YES in step S502) and the processing proceeds to step S503. On the other hand, if the traffic volume (link usage rate) obtained in step S501 is less than the predetermined threshold, the AP 101 makes a determination of NO in this step (NO in step S502) and the processing proceeds to step S506.

The threshold used in making the determination may be set by the AP 101 in advance, or calculated by the AP 101 from the link metrics of the entire MAP network 111. The threshold may be set by the user.

In the present exemplary embodiment, the AP 101 makes the determination in this step based on the traffic volume. However, this is not restrictive. If the AP 101 obtains the physical rate of the target backhaul link as the communication status in step S501, the AP 101 may make the determination in step S502 based on the physical rate. In such a case, the AP 101 determines in this step whether the physical rate is lower than or equal to a predetermined threshold. Alternatively, if the AP 101 obtains capability information about the throughput of at least either one of the APs 102 and 103 as the communication status in step S501, the AP 101 may make the determination in step S502 based on the throughput. In such a case, the AP 101 determines in step S502 whether the throughput is lower than or equal to a predetermined threshold.

In step S503, the AP 101 obtains the communication status of the entire MAP network 111. In this step, the AP 101 obtains a communication status such as the link metrics of constructed networks from all the agents in the MAP network 111. Specifically, the AP 101 obtains the traffic volumes, physical rates, or throughput of the networks constructed by all the agents in the MAP network 111. Like step S501, the AP 101 may transmit query messages for obtaining information about the link metrics and obtain the communication status from response messages. If the AP 101 has not found out the frequency channels of the networks constructed by the agents, the AP 101 may obtain information about the frequency channels in this step.

In step S504, the AP 101 determines whether the establishment of a plurality of backhaul links between the target agents affects other communications in the MAP network 111 based on the communication status of the entire MAP network 111, obtained in step S503. For example, if a new network 108 is constructed to establish a new backhaul link, wireless frames such as a beacon and data communication between backhaul links are transmitted on the same frequency channel as that of the network 108. The establishment of a new backhaul link can thus interfere with existing communications and cause adverse effects such as a drop in the data communication speed of the existing communications and a packet loss. Making the determination can prevent a new backhaul link from interfering with communications via other links already established in the MAP network 111.

Specifically, in this step, the AP 101 determines whether there is another link on the same frequency channel as that of the new backhaul link to be established. If there is another link, the AP 101 makes a determination of YES in this step (YES in step S504) and the processing proceeds to step S506. On the other hand, if there is no other link, the AP 101 makes a determination of NO in this step (NO in step S504) and the processing proceeds to step S505. If the determination in this step is YES, the AP 101 may further make a determination based on the communication status of another link on the same frequency channel. Specifically, if the traffic volume (link usage rate) of another link is less than or equal to a predetermined threshold, the AP 101 determines that the new backhaul link to be established will not affect the existing link, and the processing proceeds to step S505. On the other hand, if the traffic volume (link usage rate) of another link is greater than a predetermined threshold, the AP 101 determines that the new backhaul link to be established can affect the existing link, and the processing proceeds to step S506.

Steps S503 and S504 may be omitted. In such a case, if the determination in step S502 is YES, the processing proceeds to step S505.

In step S505, the AP 101 determines that to establish a plurality of backhaul links. Specifically, the AP 101 may store information indicating the determination that a plurality of backhaul links between the target agents is needed. By contrast, in step S506, the AP 101 determines to not establish a plurality of backhaul links. Specifically, the AP 101 may store information indicating the determination that a plurality of backhaul links between the target agents is not needed. After step S505 or S506, the processing ends.

The determination process illustrated in FIG. 5 is just an example and not restrictive. In the present exemplary embodiment, the determination is made based on the communication status between the target agents and the communication status of the entire MAP network 111. However, this is not restrictive, and whether to establish a plurality of backhaul links may be determined based on the user's selection. In such a case, the processing of steps S501 to S504 may be omitted. For example, if the establishment of a plurality of backhaul links in the MAP network 111 is enabled by the user's setting, the AP 101 performs the processing of step S505. On the other hand, if the establishment of a plurality of backhaul links in the MAP network 111 is disabled by the user's setting, the AP 101 performs the processing of step S506. Alternatively, whether to enable the establishment of a plurality of backhaul links between specific agents may be set by the user. The user can make the setting via an STA connected to the AP 101 by a wired or wireless LAN or via the input unit 202 of the AP 101. The user can make the setting via another device connected over an external network to which the AP 101 is connected, or via an STA belonging to a network in the MAP network 111.

Alternatively, the AP 101 may make the determination of FIG. 5 based on the radio wave condition of the existing backhaul link. Specifically, if at least either one of the RSSIs of the APs 102 and 103 is lower than a predetermined threshold, the AP 101 performs the processing of step S505 to establish a plurality of backhaul links between the APs 102 and 103. If the RSSIs are higher than or equal to the predetermined threshold, the AP 101 performs the processing of step S506. In such a manner, if an RSSI related to the existing backhaul link between the APs 102 and 103 is low, a backup backhaul link can be established by establishing a plurality of backhaul links.

Referring back to FIG. 4, in step S404, the AP 101 determines whether to establish a plurality of backhaul links between the agents. The AP 101 makes this determination based on the determination result of step S403. Specifically, if the processing of step S505 in FIG. 5 is performed, the AP 101 makes a determination of YES. If the processing of step S506 in FIG. 5 is performed, the AP 101 makes a determination of NO. If the determination in this step is NO (NO in step S404), the processing returns to step S403. The AP 101 may include a timer, and if a determination of YES is not made in step S404 before a lapse of a predetermined time from when a determination of NO is made in step S404 for the first time, may end the processing of this flowchart. Alternatively, the AP 101 may end the processing of this flowchart if a determination of NO is made in step S404 a predetermined number of times in succession. If the determination in step S404 is YES (YES in step S404), the processing proceeds to step S405.

In step S405, the AP 101 transmits a backhaul establishment start message to the target agents (at least either one of the APs 102 and 103). The backhaul establishment start message transmitted here corresponds to those described in steps F315 and F317 of FIG. 3.

In step S406, the AP 101 determines whether backhaul establishment start response messages are received from the target agents (at least either one of the APs 102 and 103). The backhaul establishment start response messages to be received here correspond to those described in steps F316 and F318 of FIG. 3. In this step, the AP 101 waits for the reception of backhaul establishment start response messages from the agents to which the backhaul establishment start message is transmitted in step S406. If the backhaul establishment start response messages are not received (NO in step S406), the processing returns to step S406. If the backhaul establishment start response message are not received before a lapse of a predetermined time from the transmission of the backhaul establishment start message in step S405, the AP 101 may end the processing of this flowchart. If the backhaul establishment start response messages are received (YES in step S406), the processing proceeds to step S407.

In step S407, the AP 101 determines whether a new backhaul link can be established between the target agents (between the APs 102 and 103). Specifically, the AP 101 determines whether the backhaul establishment start response messages received in step S406 include information indicating that a new backhaul link can be established. If the backhaul establishment start response messages received from both the APs 102 and 103 include the information indicating that a new backhaul link can be established, the AP 101 makes a determination of YES in this step (YES in step S407) and the processing proceeds to step S408. On the other hand, if the backhaul establishment start response message(s) received from at least either one of the APs 102 and 103 includes information indicating that a new backhaul link is unable to be established, the AP 101 makes a determination of NO in this step (NO in step S407) and the processing proceeds to step S409.

If a new backhaul link is unable to be established, then in step S409, the AP 101 performs processing for cancelling the establishment of a new backhaul link. Specifically, the AP 101 transmits a stop message to stop the processing for establishing the backhaul link to at least either one of the APs 102 and 103. The AP 101 may transmit the stop message to only the agent, if any, from which the backhaul establishment start response message including the information indicating that a new backhaul link can be established is transmitted. If the AP 101 has instructed the AP 102 to construct the network 108 to establish a new backhaul link, the AP 101 may instruct the AP 102 to stop the network 108. After the execution of step S409, the processing ends.

On the other hand, if a new backhaul link can be established, then in step S408, the AP 101 determines whether a backhaul establishment completion message is received from the target agents. The backhaul establishment completion message to be received here corresponds to those described in steps F324 and F326 of FIG. 3. The AP 101 may just receive the message from at least either one of the APs 102 and 103.

In the present exemplary embodiment, the AP 101 is described to receive the backhaul establishment start response messages. However, this is not restrictive. The AP 101 may start a timer after the transmission of a backhaul establishment start message, and determine whether a backhaul establishment completion message is received before a lapse of a predetermined time. In other words, after the execution of step S405, the AP 101 may skip the processing of steps S406 and S407 and execute the processing of step S408. In such a case, if a backhaul establishment completion message is not received before a lapse of a predetermined time, the processing proceeds to step S409. If a backhaul establishment completion message is received before a lapse of a predetermined time, the processing proceeds to step S410.

In step S410, the AP 101 transmits a backhaul establishment confirmation message to the target agents (at least either one of the APs 102 and 103). The backhaul establishment confirmation message transmitted in this step corresponds to those described in steps F325 and F327 of FIG. 3. This step may be omitted. After the execution of this step, the processing ends.

As illustrated in FIG. 4, the controller controls whether to establish a plurality of backhaul links between the agents, whereby backhaul links can be established while taking into account the effect on other communications in the MAP network 111.

Figure 6:
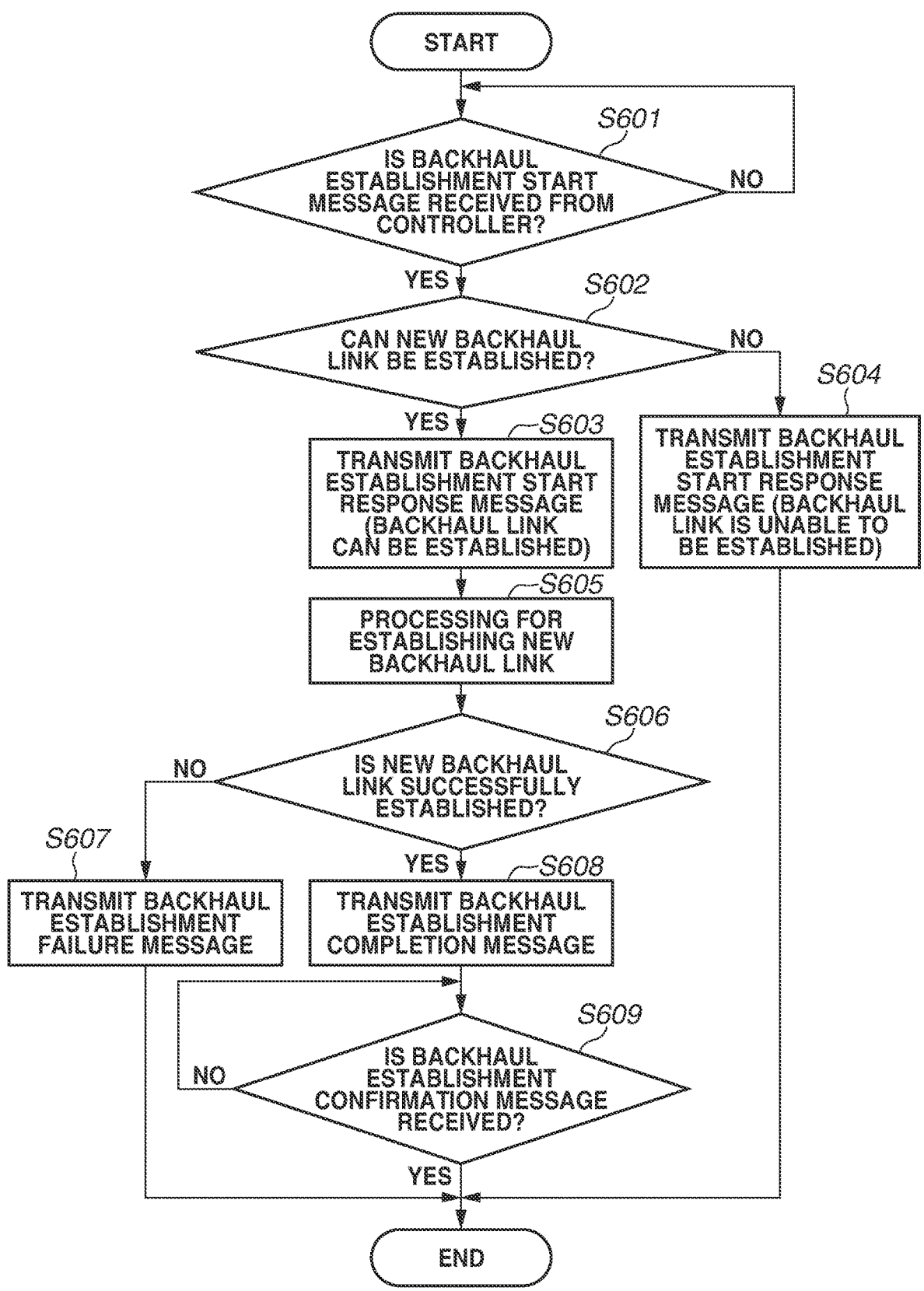
FIG. 6 is a flowchart illustrating an example of processing performed by the AP 102 in establishing a plurality of backhaul links to the AP 103 according to one embodiment.

FIG. 6 is a flowchart illustrating processing performed when the AP 102 establishes a plurality of backhaul links with the AP 103. The processing is performed by the control unit 207 reading a computer program stored in the storage unit 206 and executing the computer program.

The AP 102 starts the processing of this flowchart when a new backhaul link is established with another agent controlled by the AP 102. Alternatively, the AP 102 may start the processing of this flowchart based on instructions from the user.

In step S601, the AP 102 determines whether a backhaul establishment start message is received from the AP 101 which is the controller. The backhaul establishment start message to be received here corresponds to that described in step F315 of FIG. 3. If no backhaul establishment start message is received (NO in step S601), the processing returns to step S601. If no backhaul establishment start message is received before a lapse of a predetermined time from the start of the processing of this flowchart, the processing ends. On the other hand, if a backhaul establishment start message is received (YES in step S601), the processing proceeds to step S602.

In step S602, the AP 102 determines whether the AP 102 can establish a new backhaul link. Since details of the determination process have been described in conjunction with step F316 of FIG. 3, a description thereof will be omitted. If a new backhaul link can be established (YES in step S602), the processing proceeds to step S603. On the other hand, if a new backhaul link is unable to be established (NO in step S602), the processing proceeds to step S604.

If the AP 102 is unable to establish a new backhaul link, then in step S604, the AP 102 transmits a backhaul establishment start response message including information indicating that a backhaul link is unable to be established to the AP 101 which is the controller. After the processing of step S604, the processing ends.

On the other hand, if the AP 102 can establish a new backhaul link, then in step S603, the AP 102 transmits a backhaul establishment start response message including information indicating that a backhaul link can be established to the AP 101 which is the controller. The backhaul establishment start response message transmitted here corresponds to that described in step F316 of FIG. 3.

In step S605, the AP 102 performs processing for establishing a new backhaul link with the AP 103. In the present exemplary embodiment, the AP 102 performs the establishment process using the WPS method, described in steps F319 to F323 of FIG. 3, with the AP 103.

In step S606, the AP 102 determines whether a new backhaul link is successfully established. If the AP 102 succeeds in establishing a new backhaul link with the AP 103 (YES in step S606), the processing proceeds to step S608. On the other hand, if the AP 102 fails in establishing a new backhaul link with the AP 103 (NO in step S606), the processing proceeds to step S607.

If a new backhaul link with the AP 103 fails to be established, then in step S607, the AP 102 transmits a backhaul establishment failure message to the AP 101 which is the controller. After the processing of step S607, the processing ends.

On the other hand, if a new backhaul link with the AP 103 is successfully established, then in step S608, the AP 102 transmits a backhaul establishment completion message to the AP 101 which is the controller. The backhaul establishment completion message transmitted here corresponds to that described in step F324 of FIG. 3.

In step S609, the AP 102 determines whether a backhaul establishment confirmation message is received from the AP 101 which is the controller. As described above, a backhaul establishment confirmation message may not be transmitted from the AP 101, in which case this step is omitted. The backhaul establishment confirmation message to be received here corresponds to that described in step F325 of FIG. 3. If no backhaul establishment confirmation message is received from the AP 101 (NO in step S609), the processing returns to step S609. On the other hand, if a backhaul establishment confirmation message is received from the AP 101 which is the controller (YES in step S609), the processing ends.

As described above, FIG. 6 illustrates the processing performed when the AP 102 establishes a plurality of backhaul links with the AP 103. By this processing, a plurality of backhaul links can be established between the agents based on instructions from the controller.

Figure 7:
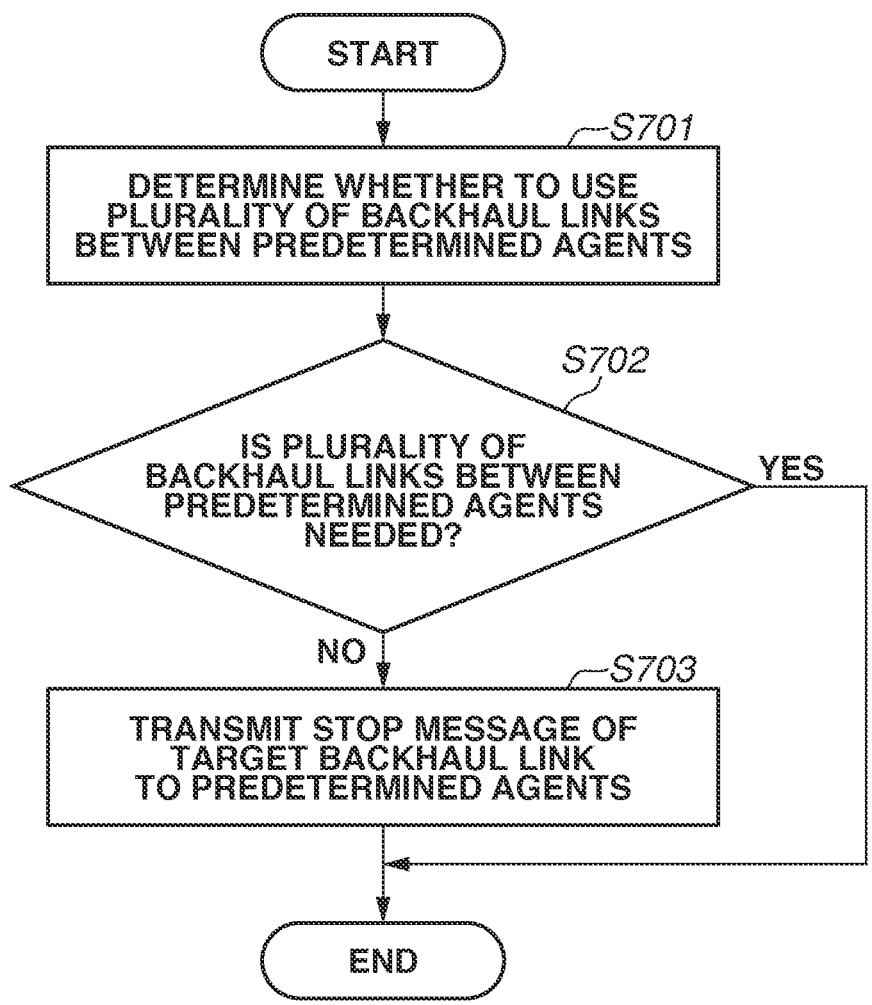
FIG. 7 is a flowchart illustrating an example of processing performed by the AP 101 in stopping a predetermined backhaul link among a plurality of backhaul links from being established between the APs 102 and 103 according to one embodiment.

FIG. 7 is a flowchart illustrating processing performed when the AP 101 stops a backhaul link between the APs 102 and 103. The processing is performed by the control unit 207 reading a computer program stored in the storage unit 206 and executing the computer program. If a plurality of backhaul links is established between the APs 102 and 103 and then no longer used by the target agents, the controller stops either one of the backhaul links.

The AP 101 starts the processing of this flowchart when a plurality of backhaul links is established between the APs 102 and 103. Alternatively, the AP 101 may start the processing of this flowchart based on instructions from the user.

In step S701, the AP 101 initially determines whether to use a plurality of backhaul links between predetermined agents. In this step, processing similar to that of the flowchart illustrated in FIG. 5 is performed. Specifically, the AP 101 determines whether the traffic volume (link usage rate) of each of the plurality of backhaul links established between the APs 102 and 103 is less than or equal to a predetermined threshold. The threshold in this step is less than that in step S502. If the traffic volume (link usage rate) of either one of the backhaul links is less than or equal to the predetermined threshold, the AP 101 may determine that a plurality of backhaul links between the APs 102 and 103 is not needed. On the other hand, if the traffic volumes (link usage rates) of both the backhaul links are greater than the predetermined threshold, the AP 101 may determine that a plurality of backhaul links between the APs 102 and 103 is needed. Instead or in addition, the AP 101 may make the determination based on the communication status in the MAP network 111. Specifically, the AP 101 makes the determination based on the traffic volume (link usage rate) of another link in the MAP network 111 using the same frequency channel as that of either one of the plurality of backhaul links established between the APs 102 and 103. If the traffic volume (link usage rate) of another link is greater than or equal to a predetermined threshold, the AP 101 determines to not use a plurality of backhaul links between the APs 102 and 103. On the other hand, if the traffic volume (link usage rate) of another link is less than the predetermined threshold, the AP 101 determines to use a plurality of backhaul links between the APs 102 and 103. Alternatively, the AP 101 may make the determination based on instructions from the user. Specifically, if execution of a plurality of backhaul links in the MAP network 111 is disabled by the user's setting, the AP 101 determines to not use a plurality of backhaul links between the APs 102 and 103. The AP 101 makes a similar determination if the user gives an instruction to end a plurality of backhaul links between the APs 102 and 103.

Alternatively, if there is a plurality of backhaul links established to provide a backup for a backhaul link between the agents, the AP 101 may make the determination based on the radio wave condition of the backhaul link for main use. Specifically, if the RSSI of the backhaul link for main use is greater than or equal to a predetermined threshold, the AP 101 determines to not use a plurality of backhaul links between the APs 102 and 103. On the other hand, if the RSSI of the backhaul link for main use is less than the predetermined threshold, the AP 101 determines to use a plurality of backhaul links between the APs 102 and 103.

In step S702, the AP 101 determines whether to use a plurality of backhaul links between the predetermined agents based on the result of the determination made in step S701. If, in step S701, a plurality of backhaul links is determined to be used between the APs 102 and 103, the AP 101 makes a determination of YES in this step (YES in step S702) and the processing ends. The plurality of backhaul links between the APs 102 and 103 is thereby maintained. On the other hand, if, in step S701, a plurality of backhaul links is determined to not be used, the AP 101 makes a determination of NO in this step (NO in step S702) and the processing proceeds to step S703.

In step S703, the AP 101 transmits a stop message for giving an instruction to stop a target backhaul link to the predetermined agents (at least either one of the APs 102 and 103). The backhaul link to be stopped here is that the traffic volume (link usage rate) of which is determined to be less than or equal to the predetermined threshold in step S701. Which backhaul link to stop in a case where the traffic volumes (link usage rates) of both the backhaul links are less than or equal to the predetermined threshold may be set in the AP 101 in advance. In such a case, the AP 101 may determine which backhaul link to stop based on the frequency bands (2.4- or 5-GHz) where the backhaul links are established. The AP 101 may determine to maintain a backhaul link of greater traffic volume (higher link usage rate). Alternatively, which backhaul link to maintain may be selected by the user. The stop message is transmitted via the backhaul link other than the one to be stopped. After the execution of the processing of step S703, the processing ends.

At least either one of the APs 102 and 103 receives the stop message from the AP 101 and stops the corresponding backhaul link. The AP 102 constructing the network 108 where the backhaul link is established may stop the network 108 if no other communication is performed on the network 108. The AP 102 may autonomously stop the network 108. The AP 101 may instruct the AP 102 to stop the network 108.

As described above, FIG. 7 illustrates a method for stopping one of a plurality of backhaul links by the control of the controller if the plurality of backhaul links is no longer used between the agents. The controller can control the plurality of backhaul links between the agents based on a change in the traffic volumes of the backhaul links and a change in the communication status in the MAP network 111.

In the present exemplary embodiment, the WPS method is described to be used in establishing a backhaul link. However, this is not restrictive, and the DPP method may be used. In the DPP method, the communication parameters are shared by a method compliant with the Wi-Fi DPP standard. In the communication parameter sharing process compliant with the Wi-Fi DPP standard, an apparatus playing the role of providing communication parameters is referred to as a configurator, and an apparatus playing the role of obtaining the communication parameters is referred to as an enrollee. The enrollee can join a network by using communication parameters obtained from the configurator. The configurator can provide communication parameters not only to an STA but also to an AP so that the AP constructs a network using the provided communication parameters.

Figure 8:
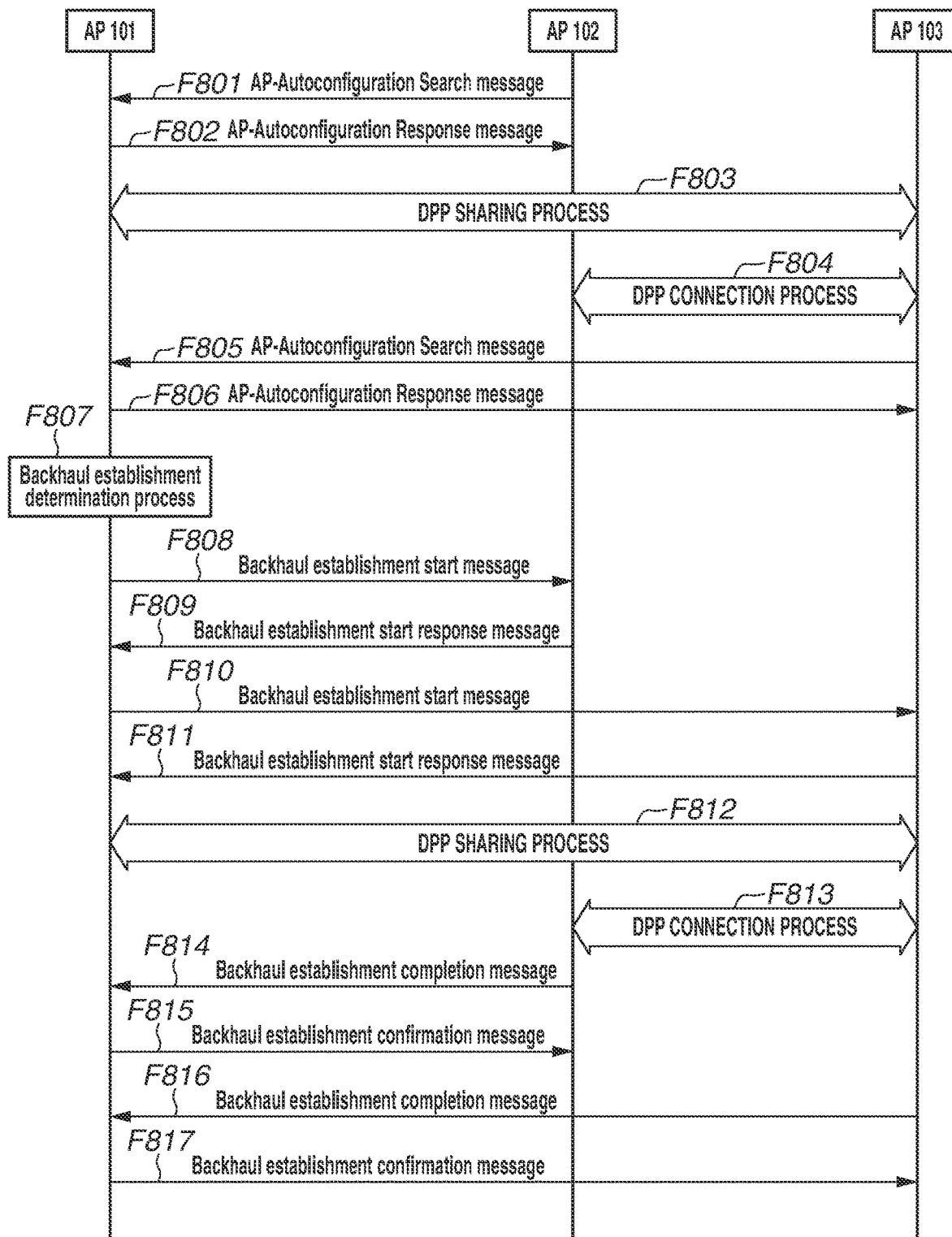
FIG. 8 is a sequence diagram illustrating another example of the processing performed in the case where the APs 102 and 103 establish a plurality of backhaul links between each other according to one embodiment.

FIG. 8 is a sequence diagram illustrating an example of processing performed when the APs 102 and 103 establish a plurality of backhaul links by using the DPP method. In the present exemplary embodiment, the AP 101 operates as a configurator, and the APs 102 and 103 as enrollees. At the start of the sequence of FIG. 8, the AP 101 has already shared communication parameters with the AP 102 by using the DPP method, and the AP 102 has joined the network 106 constructed by the AP 101.

In step F801, the AP 102 initially transmits an AP-Autoconfiguration Search message to search the MAP network 111 for a controller. This processing is similar to that of step F301 in FIG. 3.

In step F802, the AP 101 operating as the controller receives the search signal from the AP 102, and transmits an AP-Autoconfiguration Response message to the AP 102. This processing is similar to that of step F302 in FIG. 3.

In FIG. 3, since the WPS method is used, the APs 101 and 102, and the APs 101 and 103, transmit and receive AP-Autoconfiguration WSC messages therebetween (steps F303, F304, F312, and F313 in FIG. 3). By contrast, the use of the DPP method does not involve the transmission and reception of such messages. In this processing, messages including capability information about wireless communication of the APs 102 and 103 and information about wireless I/Fs or BSSs other APs can join are then transmitted instead of the WSC messages. Alternatively, such information may be included in the AP-Autoconfiguration Search messages transmitted from the APs 102 and 103. Alternatively, the AP 101 may transmit a query message for requesting acquisition of such information, and the APs 102 and 103 may transmit the corresponding information as included in a response message to the query message.

In step F803, to establish a new backhaul link to the AP 102, the AP 103 initially performs a DPP sharing process with the AP 101. The DPP sharing process includes a bootstrapping process, an authentication process, and a configuration process.

The APs 101 and 103 initially perform the bootstrapping process. By the bootstrapping process, the configurator and the enrollee share public key information. Specifically, the configurator uses its camera function to capture and share public key information included in a Quick Response (QR) code (registered trademark) related to the enrollee. This is not restrictive, and the public key information may be shared by Bluetooth (registered trademark) communication or NFC communication. Alternatively, the configurator and the enrollee may share the public key information by a public key exchange (PKEX) method where the public key information is shared by using a common character string.

Next, the APs 101 and 103 performs the authentication process. The authentication process is performed between a configurator and an enrollee. In this process, the configurator and the enrollee exchange authentication request, authentication response, and authentication confirmation frames to authenticate each other's devices.

Next, the APs 101 and 103 perform the configuration process. In the configuration process, the configurator provides the enrollee with a connector that includes communication parameters. A connector includes various types of information used by an authentication protocol and a key exchange algorithm defined by the Wi-Fi DPP standard. In the present exemplary embodiment, the connector includes information for joining the network 107 constructed by the AP 102. The information provided by the AP 101 in the configuration process may include information for identifying a connection destination using communication parameters, such as the SSID of the AP that is the connection destination.

In step F804, the AP 103 performs a DPP connection process by using the connector obtained from the AP 101. Specifically, the AP 103 joins the network 107 constructed by the AP 102 and establishes a backhaul link by using the obtained connector.

In step F805, the AP 103 transmits an AP-Autoconfiguration Search message to the AP 101. In step F806, the AP 101 transmits an AP-Autoconfiguration Response message to the AP 103 as a response thereto. Such processing is similar to that of steps F310 and F311 in FIG. 3. Like the processing of steps F801 and F802, the capability information about the wireless communication of the AP 103 and the information about wireless I/Fs and BSSs other APs can join may be transmitted in step F805 or by using another message.

In step F807, the AP 101 determines whether to establish a plurality of backhaul links between the APs 102 and 103. This processing is similar to that of step F314 in FIG. 3. In the present exemplary embodiment, the AP 101 determines to establish a plurality of backhaul links between the APs 102 and 103.

The processing of steps F808 to F811 in FIG. 8 is similar to that of steps F315 to F318 of FIG. 3. In this processing, the backhaul establishment start messages (steps F808 and F810) include information for giving an instruction to establish a new backhaul link by the DPP method.

In step F812, the APs 101 and 103 perform a DPP sharing process to establish a new backhaul link. The processing performed here is similar to that of step F803. The connector provided by the AP 101 in step F812 includes communication parameters for joining the network 108 constructed by the AP 102. Since the APs 101 and 103 have already performed the DPP sharing process in step F803, a dispensable process or processes may be omitted. Specifically, the bootstrapping process may be omitted. Alternatively, the bootstrapping process and the authentication process may be omitted to perform only the configuration process.

In step F813, the AP 103 performs a DPP connection process by using the connector obtained in step F812. The AP 103 can thereby join the network 108 of the AP 102 and establish a second backhaul link to the AP 102.

The processing of steps F814 to F817 in FIG. 8 is similar to that of steps F324 to F327 in FIG. 3.

As illustrated in FIG. 8, the APs 102 and 103 can thus perform the on-boarding process using the DPP method. In FIG. 8, the DPP sharing process (step F812) is performed again in establishing a plurality of backhaul links. However, this is not restrictive, and all the connectors used to establish the backhaul links may be provided by the first DPP sharing process (step F803). Specifically, in step F803, the AP 101 may provide the AP 103 with the connectors for joining both the networks 107 and 108 constructed by the AP 102. In such a case, when transmitting the backhaul establishment start messages to the APs 102 and 103, the AP 101 may include information for specifying which connectors to use to establish the backhaul links. In addition, the AP 103 skips the processing of step F812.

In the present exemplary embodiment, a plurality of APs is described to be connected via wireless networks and perform wireless communication. However, this is not restrictive. At least some of the APs may be connected via a wired network or networks and perform wired communication. In establishing a plurality of backhaul links, one of the backhaul links may be established via wired communication and the other(s) via wireless communication.

The APs 101, 102, and 103 may select the DPP method of higher security if the other device to share communication parameters with supports both the WPS and DPP methods. Alternatively, which sharing process to perform may be determined by user selection. Alternatively, if the other apparatus supports only either one of the methods, that method is selected.

At least part or all of the flowcharts of the APs 101 and 102 illustrated in FIGS. 4, 5, 6, and 7 may be implemented by hardware. In the case of hardware implementation, for example, a predetermined compiler may be used to generate dedicated circuits on a field-programmable gate array (FPGA) from the computer programs for implementing the steps, and the generated dedicated circuits may be used. Like an FPGA, a gate array circuit may be formed for hardware implementation. An application specific integrated circuit (ASIC) may be used for implementation. The steps of the flowcharts illustrated in FIGS. 4, 5, 6, and 7 may be performed by a not-illustrated plurality of CPUs or apparatuses in a distributed manner. The same applies to the sequences of FIGS. 3 and 8.

The exemplary embodiment has been described in detail. However, an exemplary embodiment of the present invention can take various forms such as a system, an apparatus, a method, a program, and a recording medium (storage medium). Specifically, among other things, an exemplary embodiment of the present invention may be applied to a system including a plurality of devices (such as a host computer, an interface device, an imaging apparatus, and a web application), or to an apparatus including a single device, for example.

According to an exemplary embodiment of the present disclosure, a communication apparatus controlling a network including a plurality of base stations can control establishment of a plurality of links when the base stations establish the links therebetween.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments of the present disclosure have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-198009, filed Oct. 30, 2019, which is hereby incorporated by reference herein in its entirety.

What is claimed is:

1. A communication apparatus comprising:
   one or more processors; and
   one or more memories storing computer-readable instructions that, when executed by the one or more processors, cause the communication apparatus to:
   perform communication with a base station having a function of constructing a network;
   control a network including a plurality of base stations including the communicating base station, with which the communication is performed;
   transmit, to a first base station and/or a second base station included in the controlled network controlled by the communication apparatus, a message for establishing a plurality of links between the first base station and the second base station, wherein one of the plurality of links is associated with a first frequency band that is different from a second frequency band with which another of the plurality of links is associated;
   obtain, in a case where a plurality of links is established between the first base station and second base station, information about traffic volumes of the plurality of links;
   determine, in a case where the traffic volume of at least any one of the plurality of links is less than a predetermined second threshold, that the plurality of links is not to be used; and
   transmit a message for stopping the link having the traffic volume less than the predetermined second threshold among the plurality of links.

2. The communication apparatus according to claim 1, wherein the computer-readable instructions, when executed by the one or more processors, further cause the communication apparatus to determine whether the first base station and the second base station are capable of establishing a plurality of links to be used for communication,
   wherein the communication apparatus does not transmit the message for establishing a plurality of links between the first base station and the second base station in a case where the communication apparatus determines that the first base station and/or the second base station is not capable of establishing a plurality of links to be used for communication.

3. The communication apparatus according to claim 2, wherein the computer-readable instructions, when executed by the one or more processors, further cause the communication apparatus to, in a case where the communication apparatus determines that the first base station and the second base station are capable of establishing the plurality of links to be used for communication, determine whether to establish a plurality of links to be used for communication between the first and second base stations,
   wherein the communication apparatus transmits the message for establishing a plurality of links between the first base station and the second base station in a case where the communication apparatus determines to establish a plurality of links to be used for communication between the first and second base station.

4. The communication apparatus according to claim 3, wherein the computer-readable instructions, when executed by the one or more processors, further cause the communication apparatus to obtain information about a first link to be used for communication, the first link being established between the first base station and the second base station,
   wherein the communication apparatus makes a determination based on the obtained information about the first link.

5. The communication apparatus according to claim 4, wherein the communication apparatus obtains information about a traffic volume of the first link, and
   wherein the communication apparatus determines, in a case where the traffic volume of the first link is greater than or equal to a predetermined threshold, to establish a plurality of links to be used for communication between the first base station and the second base station.

6. The communication apparatus according to claim 4, wherein the computer-readable instructions, when executed by the one or more processors, further cause the communication apparatus to obtain information about the network controlled by the communication apparatus,
   wherein the communication apparatus makes the determination based on the information about the first link and the information about the network controlled by the communication apparatus.

7. The communication apparatus according to claim 6, wherein the communication apparatus obtains information about whether another link using a same frequency channel as that of a link to be newly established between the first base station and the second base station exists in the network controlled by the communication apparatus,
   wherein the communication apparatus determines, in a case where the traffic volume of the first link is greater than or equal to the predetermined threshold and the other link does not exist in the network, to establish a plurality of links to be used for communication between the first base station and the second base station, and wherein the communication apparatus determines, in a case where the traffic volume of the first link is greater than or equal to the predetermined threshold and the other link exists in the network, to not establish a plurality of links to be used for communication between the first base station and the second base station.

8. The communication apparatus according to claim 7, wherein the second obtaining unit is configured to further obtain information about the traffic volume of the other link, and wherein the communication apparatus determines, in a case where the traffic volume of the first link is greater than or equal to the predetermined threshold, the other link exists, and the traffic volume of the other link is less than the predetermined threshold, to establish a plurality of links to be used for communication between the first base station and the second base station.

9. The communication apparatus according to claim 1, wherein the computer-readable instructions, when executed by the one or more processors, further cause the communication apparatus to, in a case where the first base station has not constructed a network intended for a link to be newly established between the first base station and the second base station, transmit a message for causing the first base station to construct the network.

10. The communication apparatus according to claim 1, wherein a link between the first base station and the second base station is established by performing a communication parameter sharing process compliant with a Wi-Fi Protected Setup standard.

11. The communication apparatus according to claim 1, wherein a link between the first base station and the second base station is established by performing a communication parameter sharing process compliant with a Device Provisioning Protocol standard.

12. The communication apparatus according to claim 1, wherein the communication apparatus plays a role of a controller according to a Wi-Fi EasyMesh standard, and the first base station and the second base station play a role of an agent according to the Wi-Fi EasyMesh standard.

13. The communication apparatus according to claim 1, wherein the first base station and the second base station establish a backhaul link compliant with the Wi-Fi EasyMesh standard as a link to be used for communication.

14. The communication apparatus according to claim 1, wherein the communication apparatus transmits the message for establishing a plurality of links between the first base station and the second base station to the first base station by wireless communication via a first wireless network constructed by the communication apparatus, the first base station joining the first wireless network.

15. The communication apparatus according to claim 14, wherein the message for establishing a plurality of links between the first base station and the second base station that is transmitted by the communication apparatus is transmitted from the first base station to the second base station by wireless communication via a second wireless network constructed by the first base station, the second base station joining the second wireless network.

16. The communication apparatus according to claim 14, wherein the message for establishing a plurality of links between the first base station and the second base station that is transmitted by the communication apparatus is transmitted from the first base station to the second base station by wired communication, the second base station being connected to the first base station via a wired network.

17. The communication apparatus according to claim 1, wherein the communication apparatus transmits the message for establishing a plurality of links between the first base station and the second base station to the first base station by wired communication, the first base station being connected to the communication apparatus via a wired network.

18. The communication apparatus according to claim 1, wherein the communication apparatus transmits a backhaul establishment start message for starting establishment of a plurality of links to be used for communication as the message for establishing a plurality of links between the first base station and the second base station.

19. A method for controlling a communication apparatus, the method comprising:
  performing communication with a base station having a function of constructing a network;
  controlling a network including a plurality of base stations including the communicating base station, with which the communication is performed;
  transmitting, to a first base station and/or a second base station included in the controlled network, a message for establishing a plurality of links between the first base station and the second base station, wherein one of the plurality of links is associated with a first frequency band that is different from a second frequency band with which another of the plurality of links is associated;
  obtaining, in a case where a plurality of links is established between the first base station and second base station, information about traffic volumes of the plurality of links;
  determining, in a case where the traffic volume of at least any one of the plurality of links is less than a predetermined second threshold, that the plurality of links is not to be used; and
  transmitting a message for stopping the link having the traffic volume less than the predetermined second threshold among the plurality of links.

20. A non-transitory computer-readable storage medium that stores a program for causing a computer included in a communication apparatus to:
  perform communication with a base station having a function of constructing a network;
  control a network including a plurality of base stations including the communicating base station, with which the communication is performed;
  transmit, to a first base station and/or a second base station included in the controlled network, a message for establishing a plurality of links between the first base station and the second base station, wherein one of the plurality of links is associated with a first frequency band that is different from a second frequency band with which another of the plurality of links is associated;
  obtain, in a case where a plurality of links is established between the first base station and second base station, information about traffic volumes of the plurality of links;
  determine, in a case where the traffic volume of at least any one of the plurality of links is less than a predetermined second threshold, that the plurality of links is not to be used; and transmit a message for stopping the link having the traffic volume less than the predetermined second threshold among the plurality of links.

\* \* \* \* \*